Figure 1:
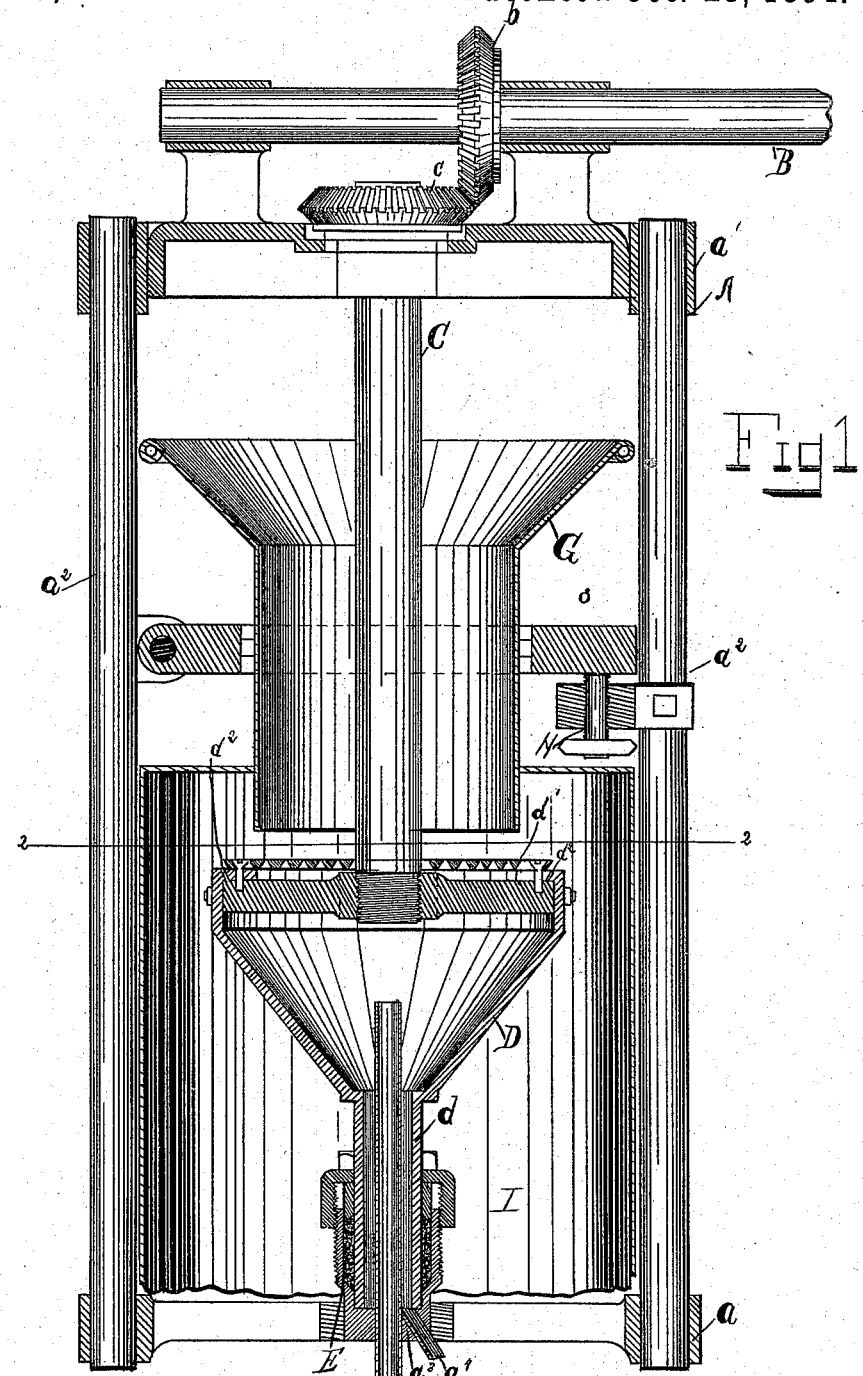

(No Model.) 2 Sheets—Sheet 1.

G. T. THOMPSON.
MACHINE FOR TEMPERING GRAIN.

No. 528,043. Patented Oct. 23, 1894.

Witnesses
Ernest K. Hood.
Benjamin Bloch.

Inventor
George T. Thompson,
By Attorney
Geo. J. Parkinson.

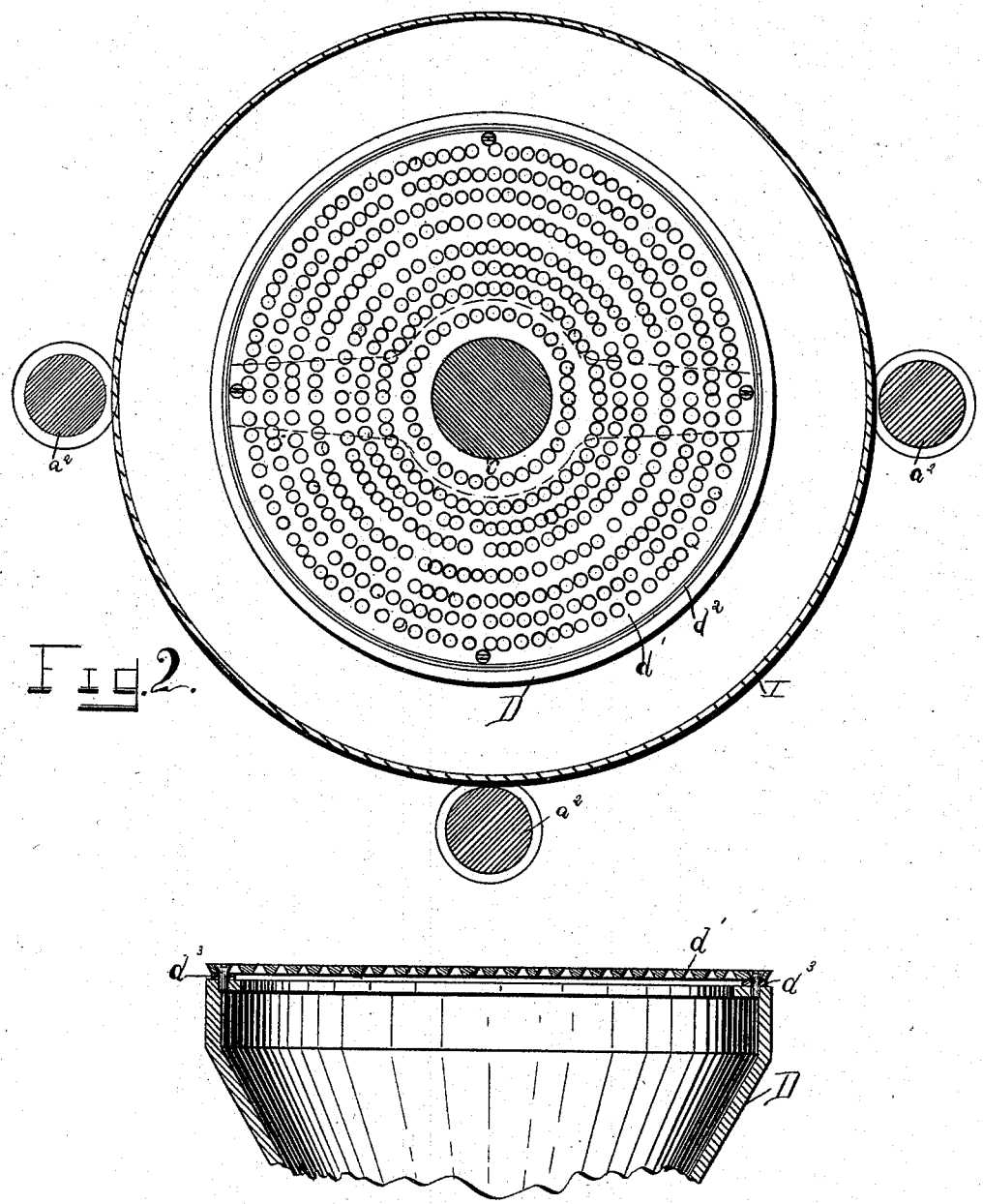

UNITED STATES PATENT OFFICE.

GEORGE T. THOMPSON, OF WARSAW, KENTUCKY.

MACHINE FOR TEMPERING GRAIN.

SPECIFICATION forming part of Letters Patent No. 528,043, dated October 23, 1894.

Application filed June 22, 1894. Serial No. 515,388. (No model.)

*To all whom it may concern:*

Be it known that I, GEORGE T. THOMPSON, a citizen of the United States of America, residing at Warsaw, in the county of Gallatin and State of Kentucky, have invented certain new and useful Improvements in Machines for Tempering Grain, of which the following is a specification.

In reducing grain for food products it is essential to separate the bran from the starch portions of the grain. In order to toughen the otherwise brittle bran and facilitate its removal the bran has been subjected to the action of live steam and the grain then passed directly to the grinding hopper. One trouble with this treatment is that when the grain has been moistened sufficiently to toughen the bran, it is left in its hot and moist condition and the moisture penetrates the grain to some extent thereby injuriously affecting its flour-producing capacity. The grain goes to the rolls in a heated state and the rolls also tend to heat it.

I find that by steaming the grain sufficiently to toughen the bran, then rapidly cooling and drying it, the moisture does not penetrate the starch producing portions of the kernel, the bran is more rapidly removed, the grain goes to the rolls in a much better condition, and larger yields are obtained.

The object of my invention is to provide a method of tempering the grain whereby the bran may be toughened without injuring the more valuable portions of the grain and to provide mechanism for carrying the method into effect.

In the drawings, Figure 1, is a vertical section of my improved grain tempering apparatus; Fig. 2, a completed section on line 2—2 of Fig. 1; Fig. 3, a sectional view showing a modification.

A represents a frame consisting of a base, $a$, and a cap, $a'$, connected by standards, $a^2$. Mounted in bearings at the top of the frame is a driving shaft, B, carrying a bevel gear, $b$, adapted to intermesh with a gear, $c$, on a vertical shaft, C. Secured to the end of the shaft, C, is a conical head, D, terminating in a tubular extension, $d$. Secured to the upper end of the head, D, is a perforated plate, or disk, $d'$. I prefer to countersink the perforations on the under side as I think it produces a better distribution of the steam. Adjacent to the periphery of the perforated plate, or disk, is a slot, $d^2$, which makes a practically continuous steam opening. A simple means of providing this slot is shown in Fig. 3, in which a washer is placed on each of the bolts, which secure the perforated plate to the body of the head, and between those parts. The lower end of the tubular extension, $d$, takes against a bearing, $a^3$, in the base, $a$. Surrounding this end of the tubular extension is a stuffing box, E, which forms a steam tight joint. Extending upward through the bearing, $a^3$, and into the conical portion of the head, D, is a steam pipe, F, of a smaller diameter than the inside of the extension, $d$. Above the head, D and surrounding the shaft, C, is a hopper, G, mounted on a pivoted arm, $g$, the free end of which takes against an adjusting screw, H, by means of which the hopper may be raised and lowered.

In treating grain the steam is turned on through the pipe, F. The head is revolved and the grain is fed into the hopper and onto the perforated plate, which forms a part of the steam head. The head fills with steam which passes through the countersunk perforations and the slot, $d^2$. To prevent scattering the grain, I surround the revolving head, D, with a casing, I, which also aids in confining the current of air to a limited area.

The grain drops from the hopper into the bath of steam and as it reaches the perforated plate is thrown off by centrifugal force, passing, as it leaves the plate, through the annular jet of steam coming from the slot, $d^2$. The revolving steam head generates a current of air between it and the casing and the grain in falling through this air current is rapidly cooled and falls to the rolls below practically as cool as when fed into the hopper. The water from the condensed steam falls into the cylindrical extension, $d$, and is drawn off through the outlet, $a^4$, in the base.

By a suitable arrangement of valves in the inlet and exhaust pipes the pressure in the steam head may be accurately gaged and just enough steam passed through the perforated top to properly treat the bran. The casing is thus kept entirely free from superfluous steam.

I find by this treatment the bran is so toughened that it can be removed in large flakes, while the starchy portion of the grain is uninjured, and a large yield of high grade flour is the result.

The apparatus is preferably mounted above the first set of rolls so that the grain may be fed direct to the rolls without any intermediate conveyers.

I claim as my invention—

1. In a grain tempering machine, the combination of a hollow revoluble head, having a perforated top; means for conveying steam to the interior of the head; and a casing surrounding the head and open at the bottom for the admission of air, substantially as and for the purpose set forth.

2. In a grain tempering machine, the combination of a revoluble steam head, having at one end a tubular extension journaled in a steam tight bearing, and a perforated plate secured to the other, substantially as and for the purpose set forth.

3. In a grain tempering machine, the combination of a revoluble steam head, having a tubular extension journaled in a steam tight bearing; a perforated plate carried by the head, and a casing surrounding the head at the bottom, substantially as and for the purpose set forth.

4. In a grain tempering machine, the combination of a revoluble steam head having a tubular extension journaled in a steam tight bearing, a perforated plate mounted on the head; a steam jet pipe leading into the tubular extension, and an exhaust pipe leading from the tubular extension, substantially as and for the purpose set forth.

5. In a grain tempering machine, the combination of a revoluble conical steam head, having a tubular extension journaled in a steam tight bearing, a perforated plate mounted on the head, and a steam jet pipe extending through the tubular extension and into the head, substantially as and for the purpose specified.

6. In a grain tempering machine the combination of a revoluble steam head, a hopper mounted above the head and means for raising and lowering the hopper, substantially as and for the purpose set forth.

GEO. T. THOMPSON.

Witnesses:
E. K. HOOD,
B. BLOCH.